United States Patent
Sasaki et al.

(10) Patent No.: US 6,476,893 B1
(45) Date of Patent: Nov. 5, 2002

(54) MULTI-LAYER PHASE RETARDER, ELLIPTICAL POLARIZER AND LIQUID CRYSTAL DISPLAY DEVICE

(75) Inventors: Shinichi Sasaki, Osaka (JP); Kazuki Tsuchimoto, Osaka (JP); Seiji Kondo, Osaka (JP)

(73) Assignee: Nitto Denko Corporation, Osaka (JP)

(*) Notice: Subject to any disclaimer, the term of this patent is extended or adjusted under 35 U.S.C. 154(b) by 189 days.

(21) Appl. No.: 09/717,294

(22) Filed: Nov. 22, 2000

(30) Foreign Application Priority Data

Nov. 22, 1999 (JP) ............................................. 11-331203

(51) Int. Cl.⁷ ......................... G02F 1/1335; G02B 5/30; B32B 9/00
(52) U.S. Cl. ........................ 349/119; 349/122; 349/96; 359/494
(58) Field of Search .............................. 349/117, 135, 349/119, 96, 122; 359/494, 486, 492, 500; 428/701, 702, 1.1, 1.3, 1.31

(56) References Cited

U.S. PATENT DOCUMENTS

| | | | | |
|---|---|---|---|---|
| 5,061,042 A | * | 10/1991 | Nakamura et al. | 349/102 |
| 5,430,566 A | * | 7/1995 | Sakaya et al. | 349/118 |
| 5,875,014 A | * | 2/1999 | Kuwabara et al. | 349/117 |
| 6,060,183 A | * | 5/2000 | Higashi et al. | 349/117 |
| 6,097,460 A | * | 8/2000 | Shimizu et al. | 349/117 |

* cited by examiner

Primary Examiner—William L. Sikes
Assistant Examiner—P. R. Akkapeddi
(74) Attorney, Agent, or Firm—Sughrue Mion, PLLC

(57) ABSTRACT

A multi-layer phase retarder is a laminated member of a phase retarder satisfying $1.05 \leq \alpha < 1.3$ and $\beta < 1$, and a phase retarder satisfying $1 < \alpha < 1.05$ and $\beta > 1$ with following proviso. The retardation in the normal direction by a light beam of a 400 nm wavelength is R1, the retardation in the normal direction by a light beam of a 550 nm is R2, the retardation in the perpendicular direction in the state tilted by 40 degrees with respect to the normal direction with the slow axis as the rotation axis is R3, and R1/R2 is $\alpha$ and R3/R2 is $\beta$. An elliptical polarizer is alaminated member of the multi-layer phase retarder, and a polarizer. A liquid crystal display device includes the multi-layer phase retarder, or the same and a polarizer at least on one side of a liquid crystal cell.

6 Claims, 1 Drawing Sheet

MULTI-LAYER PHASE RETARDER, ELLIPTICAL POLARIZER AND LIQUID CRYSTAL DISPLAY DEVICE

BACKGROUND OF THE INVENTION

1. Field of the Invention

The present invention relates to a multi-layer phase retarder with the retardation in the front and perspective directions, and the wavelength dispersion thereof controlled, capable of providing a liquid crystal display device, or the like, with the excellent display quality in a wide viewing angle range.

The present application is based on Japanese Patent Application No. Hei. 11-331203, which is incorporated herein by reference.

2. Description of the Related Art

A retardation capable of providing a liquid crystal display device with the excellent display quality in a wide viewing angle range by preferably compensating the retardation by a birefringence of a liquid crystal cell in a wide range in the front and perspective directions is called for. However, according to a conventional single layer phase retarder made of a uni-axial or bi-axial stretched film, even if the retardation in the front and perspective directions can be compensated, a problem is involved in that the wavelength dispersion of the retardation can hardly be compensated. The wavelength dispersion appears as the coloring problem in the black and white display.

SUMMARY OF THE INVENTION

An object of the invention is to provide a phase retarder capable of controlling the wavelength dispersion as well as the retardation in the front and perspective directions so as to provide a liquid crystal display device with the excellent display quality by preventing coloring of the white and black display, or the like in a wide viewing angle range.

The invention provides a multi-layer phase retarder comprising a laminated member of a phase retarder satisfying $1.05 \leq \alpha < 1.3$ and $\beta \leq 1$, and a phase retarder satisfying $1 < \alpha < 1.05$ and $\beta > 1$ with the following proviso. The retardation in the normal direction by a light beam of a 400 nm wavelength is R1, the retardation in the normal direction by a light beam of a 550 nm is R2, the retardation in the perpendicular direction in the state tilted by 40 degrees with respect to the normal direction with the slow axis as the rotation axis is R3, and R1/R2 is $\alpha$ and R3/R2 is $\beta$. An elliptical polarizer is a laminated member of the multi-layer phase retarder, and a polarizer. A liquid crystal display device includes the multi-layer phase retarder, or the same and a polarizer at least on one side of a liquid crystal cell.

According to the invention, since the laminated member comprises a combination of phase retarders satisfying the $\alpha$ and $\beta$, in addition to the retardation in the front and perspective directions, the wavelength dispersion thereof can also be controlled so that a phase retarder capable of providing a liquid crystal display device with the excellent display quality can be obtained by preventing coloring of the black and white display, or the like by compensating the retardation of a liquid crystal cell and the wavelength dispersion thereof in a wide front and perspective viewing angle range.

That is, the retardation is defined by the multiple ($\Delta nd$) of the refractive index difference ($\Delta n$) of the double refraction lights and the optical path length (d) Since the above-mentioned $\alpha$ denotes the wavelength dispersion characteristics of the retardation in the normal direction and the $\beta$ denotes the angle dependency characteristics of the retardation, by providing the phase retarders with a combination of $1.05 \leq \alpha < 1.3$ and $1 < \alpha \alpha < 1.05$, and a combination of $\beta \leq 1$ and $\beta > 1$, the retardation of each phase retarder and the wavelength dispersion by its $\alpha$ characteristics can be adjusted as well as the angle dependency of the retardation by the $\beta$ characteristics can be adjusted by controlling the crossing angle of these optical axes in an appropriate condition such as parallel and orthogonal so that the retardation in the front and perspective directions and the wavelength dispersion thereof can be controlled. Since the wavelength dispersion is an attribute of the polymer comprising the single layer phase retarder in the case of a single layer phase retarder, it is difficult to control the wavelength dispersion therein.

Features and advantages of the invention will be evident from the following detailed description of the preferred embodiments described in conjunction with the attached drawings.

DETAILED DESCRIPTION OF THE PREFERRED EMBODIMENTS

Figure 1:
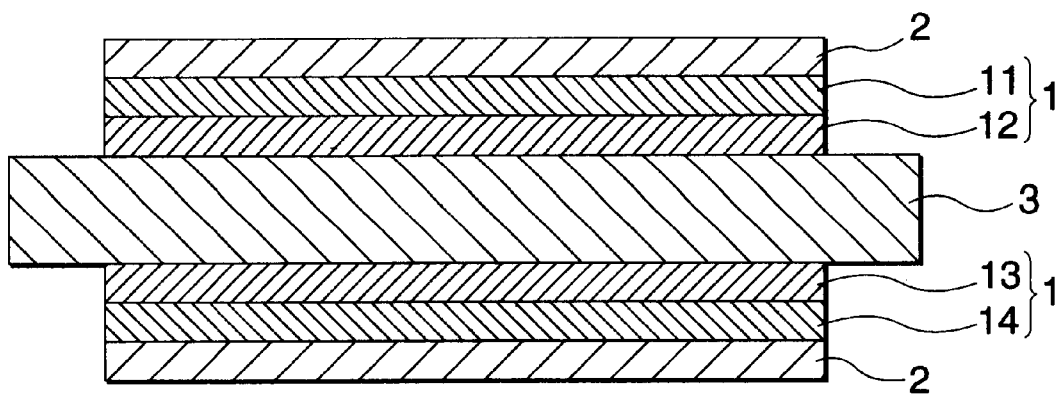
FIG. 1 is a cross-sectional view of an embodiment of a liquid crystal display device (multi-layer phase retarder).

A multi-layer phase retarder according to the invention comprises a laminated member of a phase retarder satisfying $1.05 \leq \alpha < 1.3$ and $\beta \leq 1$, and a phase retarder satisfying $1 < \alpha < 1.05$ and $\beta > 1$ with the following proviso. The retardation in the normal direction by a light beam of a 400 nm wavelength R1, the retardation in the normal direction by a light beam of a 550 nm is R2, the retardation in the perpendicular direction in the state tilted by 40 degrees with respect to the normal direction with the slow axis as the rotation axis is R3, and R1/R2 is $\alpha$ and R3/R2 is $\beta$. Such a multi-layer phase retarder 1 is shown in FIG. 1. The numerals 11, 12, 13, and 14 represent a phase retarder. The figure shows an embodiment comprising a liquid crystal display device. The numeral 2 represents a polarizer, and 3 a liquid crystal cell.

As the phase retarders, those satisfying the above-mentioned $\alpha$ and $\beta$ are used, however, polymers comprising thereof are not particularly limited, and thus any one with an appropriate light transmissivity can be used. Polymers capable of providing a film with the excellent light transmissivity with a 75% or more light transmissivity, in particular, a 85% of more light transmissivity are preferable. Moreover, for obtaining a phase retarder with the excellent heat resistance, those comprising a polymer with a positive birefringence, capable of providing a high refractive index in the stretching direction are preferable.

Examples of the polymers with a positive birefringence include polyesters such as polycarbonate, polyvinyl alcohol, cellulose resins, polyethylene terephthalate, and polyethylene naphthalate, and polyolefins such as polyallylate, polyimide, norbornene based resins, polysulfone, polyether sulfone, and polypropylene.

A phase retarder used in the invention can be obtained by controlling the retardation characteristics by an appropriate method, such as, a method of applying a stretching process to a film made from a polymer, and a method of controlling the refractive index in the thickness direction. As the film, those formed by an appropriate method, such as a casting method such as a flow stretching method, and an extrusion method can be used. In particular, a film with little thickness irregularity, orientation distortion irregularity, or the like, produced by a solution film formation method such as a casting method can be used preferably.

The film thickness can be determined optionally according to the retardation characteristics, or the like of the targeted phase retarder. In general, it is 5 to 500 μm, preferably 10 to 400μ, particularly preferably 20 to 300 μm. The film to be processed can be a non-oriented film, or a oriented film preliminarily applied with an optional orientation process such as uni-axial stretching.

The phase retarder satisfying $1.05 \leq \alpha < 1.3$ and $\beta \leq 1$ can be obtained efficiently by, for example, a method of bonding one, or two or more thermally contractible films on one side or both sides of a polymer film, and stretching or contracting the polymer film in the vertical or lateral direction, or in both directions under the contracting force provided by the thermally contractible film to the polymer film by heating so as to control the retardation characteristics, in particular, the birefringence in the thickness direction. Moreover, the phase retarder satisfying $1 < \alpha < 1.05$ and $\beta > 1$ can be obtained efficiently by a method of applying a stretching process to a polymer film by an optional method such as uni-axial method, and a bi-axial method.

Since the thermally contractible film should be peeled off from the obtained phase retarder (polymer film) after the contracting process in the method of applying the contracting force of the thermally contractible film, a bonding process with an adhesive layer is preferable for providing the easy separation property after the contracting process, and the thermal contraction transmissivity of the thermally contractible film. As the adhesive layer, an optional material such as an acrylic based material, a silicone based material, a polyester based material, a polyurethane based material, a polyether based material, and a rubber based material can be used, and it is not particularly limited.

The contracting process of the thermally contractible film bonded with the polymer film can be executed by an optional stretching machine, such as a roll stretching machine, a tenter, and a bi-axial stretching machine. The process temperature is preferably in the vicinity of the glass transitional temperature of the polymer film, in particular, in a temperature range of the glass transitional temperature ±20° C., further preferably higher than the glass transitional temperature in terms of the process operation controllability for providing the retardation highly accurately. Furthermore, from this viewpoint, it is preferable that the thermally contractible film to be used starts the thermal contraction at a temperature lower than the process temperature thereof.

The process to be applied to the polymer film under the effect of the contracting force of the thermally contractible film by heating is either stretching or contraction, and it can be determined optionally according to the phase retarder to be formed. Moreover, the process to be applied can be in either of the vertical and lateral directions (length direction and width direction), or in both directions. In the case of applying the process in both directions, a combination of applying a contracting process in one direction and applying a stretching process in the other direction can also be adopted.

The refractive index in the thickness direction can be controlled, in general, by a method of contracting at least one of the vertical and lateral directions of a polymer film, or the like. The process to be applied on the polymer film under the effect of the contracting force of the thermally contractible film can be executed in two, or three or more steps. Therefore, a process of applying the contracting force of the thermally contractible film can be executed on the same polymer film by two, or three or more times in the same direction or in different directions. Furthermore, the obtained phase retarder can be provided for the practical use, however, the retardation characteristics thereof can be adjusted by further applying a stretching process, or the like as needed.

A phase retarder to be used preferably is formed with the irregularity of the retardation by the birefringence and the orientation axis as small as possible, that is, the retardation irregularity by a transmission light in the front direction perpendicular to the film surface (normal direction) by 10 nm or less, in particular, 5 nm or less, and the orientation axis irregularity by 5 degrees or less, in particular, 3 degrees or less, but it is not limited thereto.

A multi-layer phase retarder can be formed by laminating a phase retarder satisfying $1.05 \leq \alpha < 1.3$ and $\beta \leq 1$, and a phase retarder satisfying $1 < \alpha < 1.05$ and $\beta > 1$ so that the retardation characteristics can be varied according to the combination f the phase retarders to be laminated. Moreover, the crossing angle of the optical axes of the phase retarders can be set optionally at the time of lamination so that the retardation characteristics can be varied also by the crossing angle. However, in general, the phase retarders are laminated with the optical axes thereof disposed parallel or orthogonal.

For the lamination, an optional adhesive can be used. In view of the above-mentioned adhesive layer, in particular, the heat resistance and the optical characteristics, an acrylic based material can be used preferably. To an adhesive layer such as the sticky layer, an optional additive, such as natural or synthetic resins, glass fibers or glass beads, fillers or pigments comprising metal powders or other inorganic powders, coloring agents, and antioxidants can be added as needed. Moreover, an adhesive layer with a light dispersion property can be provided by containing fine particles.

A multi-layer phase retarder according to the invention can be used preferably for compensation of the retardation by birefringence, or the like for enlargement of the viewing angle of a liquid crystal cell or improvement of the contrast. In the practical use, for example, it can be used as an optical member of an optional form, such as one provided with an adhesive layer on one side or both sides thereof for bonding with another member such as a liquid crystal cell, and one laminated with a polarizer so as to provide an elliptical polarizer.

The lamination with a polarizer, or the like, can be executed by individually laminating in a production step of a liquid crystal display device successively. However, advantages such as improvement of the production efficiency of the liquid crystal display device owing to the quality stability and the lamination operativity can be provided by preliminary lamination. Also in the lamination, an optical adhesive can be used. Moreover, in the lamination, the arrangement angle of the transmission axes or the fast axes of the multi-layer phase retarder and the polarizer is not particularly limited, and it can be determined optionally.

A polarizer to be laminated with the multi-layer phase retarder can be selected optionally. Examples thereof include polarizing films comprising hydrophilic polymer films such as a polyvinyl alcohol based film, a partially formalized polyvinyl alcohol based film and an ethylene-vinyl acetate copolymer based partially saponified film, with iodine and/or a two-color dye adsorbed and stretched, and polarizing films comprising polyene oriented films such as a dehydrated product of a polyvinyl alcohol and a dechlorination product of a polyvinyl chloride.

Moreover, the polarizer may comprise the above-mentioned polarizing films provided with a transparent protecting layer on one side or both sides. Furthermore, the polarizer may be a reflection type or a transflective type comprising a reflection layer, half mirror, or the like. Since a reflection type polarizer is for providing a liquid crystal display device for the display according to reflection of an incident light from the visual side (display side), it is advantageous in that a thinner liquid crystal display device can easily be achieved by eliminating a built-in light source such as back lighting.

The above-mentioned transparent protecting layer can be formed optionally as a polymer coated film, a protection film bonded layer, or the like. For the formation thereof, a polymer with the excellent transparency, mechanical strength, thermal stability, moisture blocking property, or the like can be used preferably. Examples thereof include a polyester based resin, an acetate based resin, a polyether sulfonic acid based resin, a polycarbonate based resin, a polyamide based resin, a polyimide based resin, a polyolefin based resin, an acrylic based resin, and thermal setting type or ultraviolet ray curing type resins such as acrylic based, urethane based, acrylic urethane based, epoxy based, and silicone based. The transparent protecting layer may be formed with the surface minute rugged structure by containing fine particles.

Moreover, the reflection type polarizer may be formed by an optional method such as a method of providing a reflection layer comprising a metal, or the like on one side of a polarizer via a transparent resin layer, or the like, as needed. Specific examples thereof include one obtained by providing a foil or a deposition film comprising a reflective metal such as an aluminum on one side of a transparent resin layer such as a protecting film, applied with a mat treatment as needed, and one obtained by providing a metal reflection layer on the surface minute rugged structure by containing the minute particles in the transparent resin layer by an optional method such as deposition and plating. A transflective type polarizer can be obtained by providing the reflection layer as that of a transflective type, such as a half mirror.

The ultraviolet ray absorbing ability can be provided to the above-mentioned layers including the phase retarder, the polarizer, the transparent protecting layer, and the adhesive layer by a method of treating with an ultraviolet ray absorbing agent, such as an ester salicylate based compound, a benzophenone based compound, a benzotriazole based compound, a cyanoacrylate based compound, and a nickel complex salt based compound, or the like.

The multi-layer phase retarder according to the invention can be used preferably for the compensation of the visual characteristics by the birefringence in various types of liquid crystal cells such as a TN type, an STN type, and a π type, for example, the offset compensation of the retardation in the perspective direction with the contrast deterioration in the front (normal) direction and the wavelength dispersion thereof, the offset compensation of the retardation in the front and perspective directions and the wavelength dispersion thereof, or the like.

A liquid crystal display device using the multi-layer phase retarder can be formed according to the conventional methods. That is, in general, the liquid crystal display device is formed by optionally assembling a liquid crystal cell, a phase retarder for the optical compensation, and as needed, components such as a polarizer, and an illumination system, and installing the same in a driving circuit. In the invention, the assembly method is not particularly limited except that the multi-layer phase retarder according to the invention is used for the optical compensation so as to be provided on at least one side of the liquid crystal cell optionally with a polarizer, and thus conventional methods can be adopted.

Therefore, an optional liquid crystal display device, such as a liquid crystal display device with a polarizer disposed on one side or both sides of a liquid crystal cell, a transmission type or a reflection type, or reflection-transmission type liquid crystal display device using back lighting, a reflector, or a transflective type reflector in the illumination system can be formed. In the case of a liquid crystal display device using a polarizer, the multi-layer phase retarder for the optical compensation is disposed preferably between the liquid crystal cell 3 and the polarizer 2 on the visual side and/or the opposite side with respect to the visual side as shown in the figure, in particular, on the visual side in terms of the compensation effect, or the like. As to the installment, one comprising the above-mentioned optical member can also be used.

In the above-mentioned description, the components of a liquid crystal display device may be laminated and integrated, or in a separated state. Moreover, as to the formation of the liquid crystal display device, optional optical elements such as a dispersion plate, an anti-glare layer, a reflection preventing film, a protecting layer, and a protecting plate may be disposed optionally. These elements may be provided for the liquid crystal display device formation in the above-mentioned form of the optical member in the state laminated with the multi-layer phase retarder. Moreover, for the liquid crystal display device formation, a phase retarder other than the multi-layer phase retarder according to the invention can also be used. As the phase retarder, the stretched films mentioned above as the phase retarders, a discotic type, or nematic type liquid crystal oriented plate, or the like may be used optionally.

EXAMPLE 1

A bi-axial stretched polystyrene film (thermally contractible film) was bonded on both sides of a 70 $\mu$m thickness long polycarbonate film of a substantially 0 retardation via an acrylic based sticky layer. A contracting process by 3% in the vertical direction and 10% in the lateral direction was applied at 160° C. by a bi-axial stretching machine so as to peel off the thermally contractible film for obtaining a phase retarder A continuously. Then, the phase retarder and a phase retarder B comprising a bi-axial stretched polypropylene film were bonded so as to have the slow axes disposed orthogonal via an acrylic based sticky layer for obtaining a multi-layer phase retarder.

EXAMPLE 2

A bi-axial stretched polystyrene film was bonded on one side of a 60 $\mu$m thickness long polyester film of a substantially 0 retardation via an acrylic based sticky layer. A contracting process by 2% in the vertical direction and 15% in the lateral direction was applied at 155° C. by a bi-axial stretching machine so as to peel off the bi-axial stretched polystyrene film for obtaining a phase retarder A continuously. Then, the phase retarder and a phase retarder B comprising a uni-axial stretched film made from a norbornene based polymer were bonded so as to have the slow axes disposed orthogonal via an acrylic based adhesive layer for obtaining a multi-layer phase retarder.

EXAMPLE 3

In the same process as in the example 2 except that the phase retarder A and the phase retarder B were bonded so as to have the slow axes parallel, a multi-layer phase retarder was obtained.

Evaluation Test

The retardations of the multi-layer phase retarders obtained in the examples were measured by a retardation meter of the parallel Nicols rotation method principle (produced by Oji Keisoku Kiki Corp.: KOBRA21-ADH) with light beams of 480.5 nm, 548.9 nm, 631.5 nm and 753.9 nm wavelengths. Thereby, the above-mentioned R1, R2, R3, $\alpha$ and $\beta$ were calculated. Results are shown in the following table.

|  | phase retarder A | | phase retarder B | | multi-layer phase retarder | |
| --- | --- | --- | --- | --- | --- | --- |
|  | $\alpha$ | $\beta$ | $\alpha$ | $\beta$ | $\alpha$ | $\beta$ |
| Example 1 | 1.136 | 0.653 | 1.012 | 1.193 | 1.009 | 1.176 |
| Example 2 | 1.186 | 0.719 | 1.030 | 1.117 | 0.761 | 0.847 |
| Example 3 | " | " | " | " | 1.084 | 0.979 |

The multi-layer phase retarders obtained in the examples 1 to 3 bonded with a polarizer were bonded on both sides of a TN type liquid crystal cell with the polarizer disposed on the outer side for forming a liquid crystal display device. The display characteristics thereof were examined. It was found out that coloring of the black and white display is prevented in a wide viewing angle in the front and perspective directions and the excellent contrast was provided so as to realize a good display quality.

From the above-mentioned result and the table, it is learned that according to a multi-layer member comprising a combination of phase retarders satisfying the predetermined $\alpha$ and $\beta$, the retardation and the wavelength dispersion thereof can be controlled in the front and perspective directions, and a liquid crystal display device with the excellent display quality can be formed by using the same so as to compensate the retardation of the liquid crystal cell and the wavelength dispersion thereof in a wide viewing angle range.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A multi-layer phase retarder comprising:

a first phase retarder satisfying $1.05 \leq \alpha < 1.3$ and $\beta \leq 1$; and a second phase retarder being laminated on said first phase retarder and satisfying $1 < \alpha < 1.05$ and $\beta > 1$, wherein a retardation in a normal direction by a light beam of a 400 nm wavelength is R1, a retardation in the normal direction by a light beam of a 550 nm is R2, a retardation in a perpendicular direction in a state tilted by 40 degrees with respect to the normal direction with a slow axis as a rotation axis is R3, and R1/R2 is $\alpha$ and R3/R2 is $\beta$.

2. A multi-layer phase retarder according to claim 1, wherein the phase retarders are made of a polymer with a positive birefringence.

3. A multi-layer phase retarder according to claim 1, further comprising an adhesive layer on one side or on both sides.

4. An elliptical polarizer comprising:

a polarizer; and said multi-layer phase retarder according to claim 1 laminated on said polarizer.

5. A liquid crystal display device comprising:

a liquid crystal cell; and said multi-layer phase retarder according to claim 1 laminated on said liquid crystal cell.

6. A liquid crystal display device according to claim 5, further comprising a polarizer laminate on said multi-layer phase retarder.

\* \* \* \* \*